United States Patent [19]

Dahms

[11] 4,246,820
[45] Jan. 27, 1981

[54] APPARATUS FOR STRAIGHT LINE SHEARING

[75] Inventor: Francis A. Dahms, Tariffville, Conn.

[73] Assignee: Emhart Industries, Inc., Farmington, Conn.

[21] Appl. No.: 13,360

[22] Filed: Feb. 21, 1979

Related U.S. Application Data

[62] Division of Ser. No. 876,086, Feb. 28, 1978, Pat. No. 4,174,647.

[51] Int. Cl.³ .......................... C03B 5/38; B26D 5/12
[52] U.S. Cl. ....................................... 83/617; 83/623; 83/639
[58] Field of Search ................. 83/600, 623, 639, 617; 65/334, 133, 303

[56] References Cited

U.S. PATENT DOCUMENTS

| | | | |
|---|---|---|---|
| 1,987,249 | 1/1935 | Stenhouse et al. | 83/600 |
| 2,018,152 | 10/1935 | Schreiber | 83/600 |
| 2,678,519 | 5/1954 | Honiss | 83/600 |
| 3,435,719 | 4/1969 | Wythe | 83/639 X |
| 3,736,826 | 6/1973 | Ward, Jr. | 83/623 X |

*Primary Examiner*—Frank T. Yost
*Attorney, Agent, or Firm*—H. Samuel Kieser

[57] ABSTRACT

A straight line shearing mechanism which includes a unique pneumatic control system to cause the operation of the shears. One feature involves the cushioning of the piston member of the pneumatic cylinder assembly on the return stroke. Another feature is the provision of an automatic retract to open the shears in the event that the shear blades do not complete their cutting stroke. Also, one blade of a set of shear blades may tilt in the event of excess tension between the blades. Additionally, one shear blade is pivotally adjustable about a pin member having an axis extending in the direction of travel of the blades. Further, the drop guides are horizontally adjustable relative to its associated shear blade in the direction of travel of the shear blade and also adjustable about a vertical axis.

2 Claims, 14 Drawing Figures

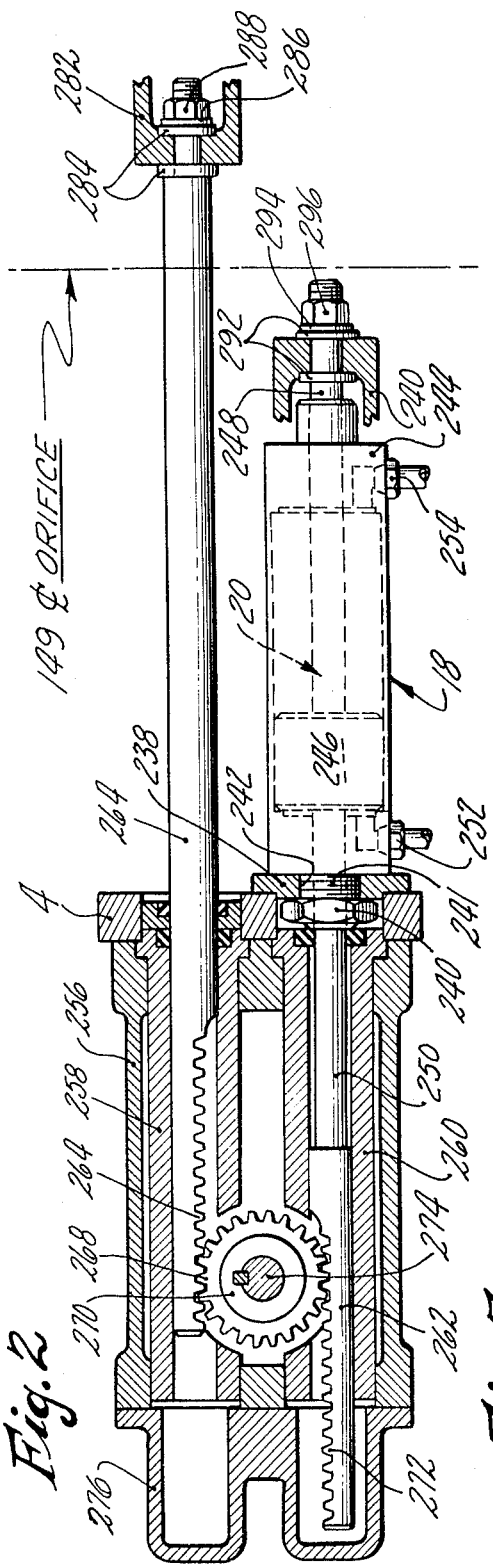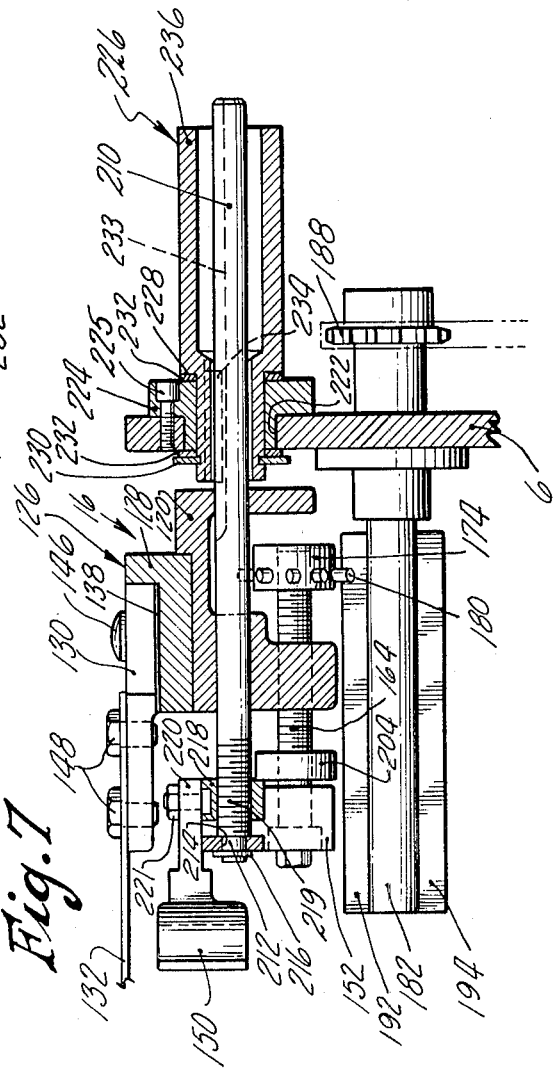

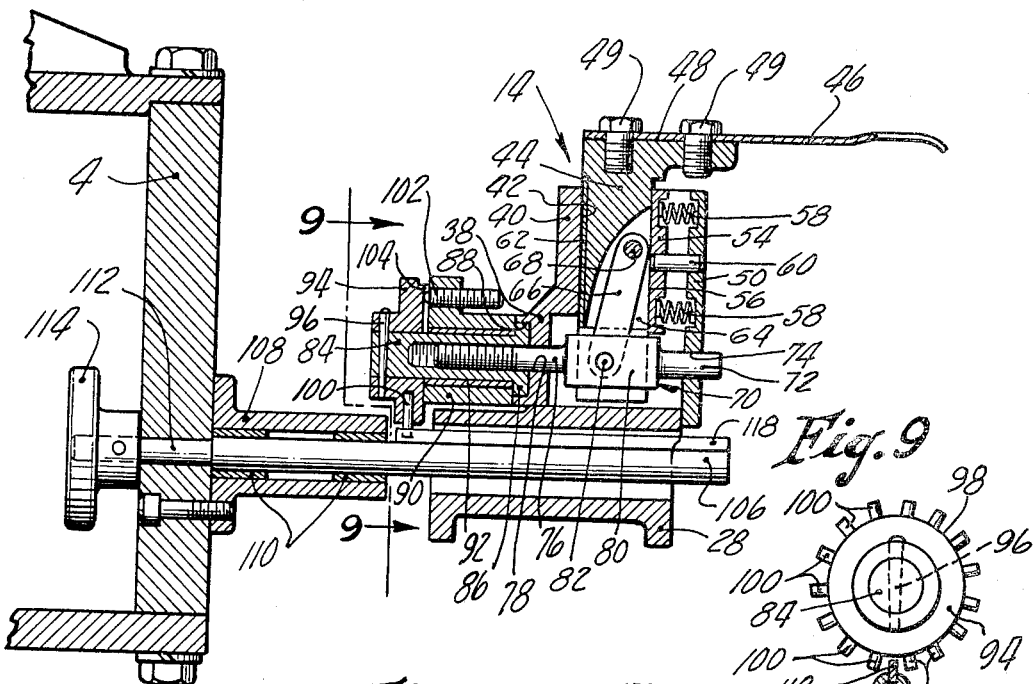
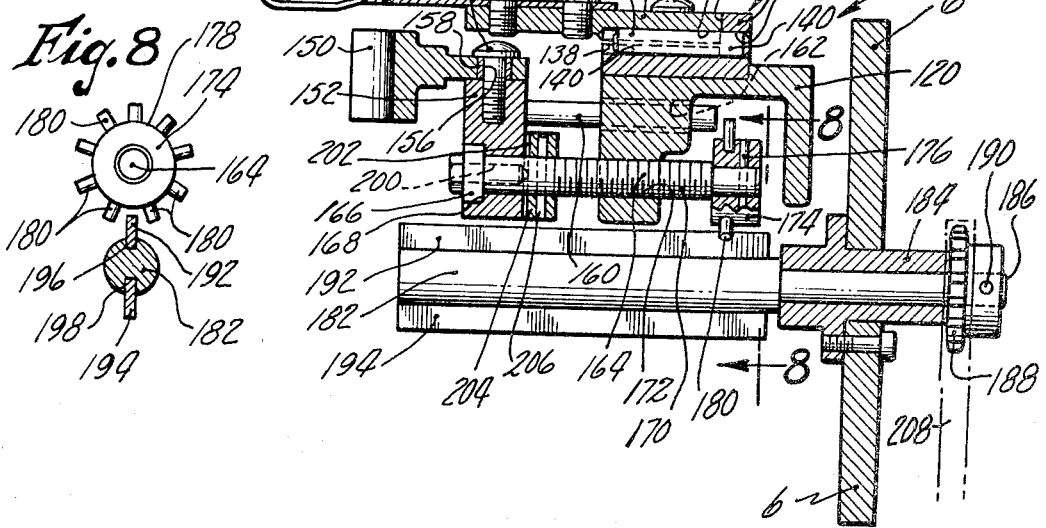

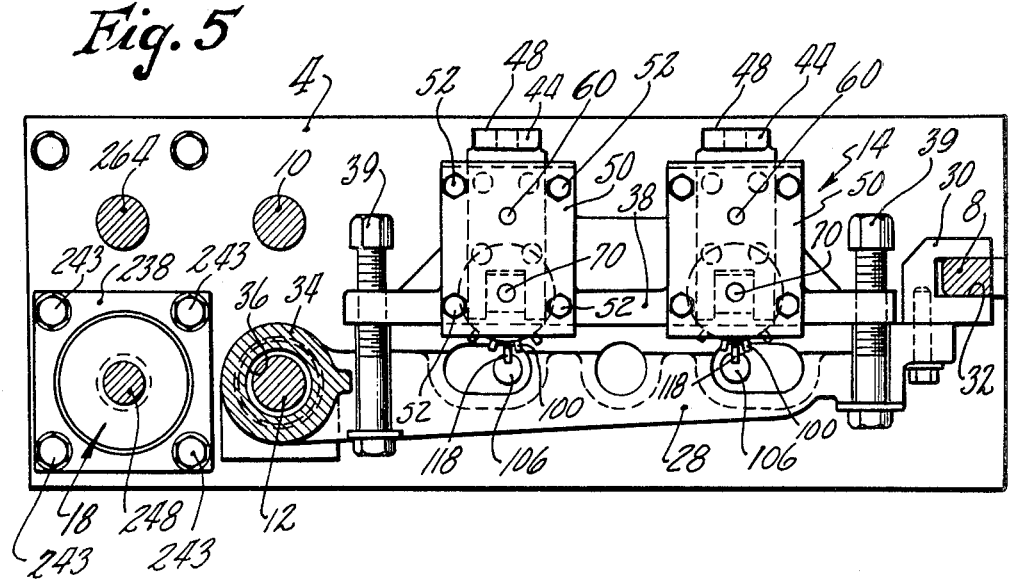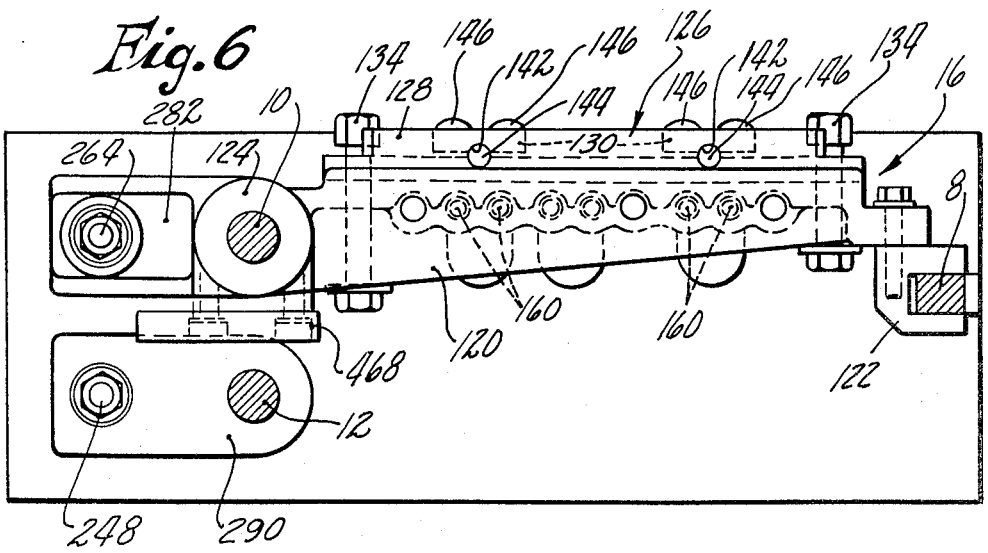

APPARATUS FOR STRAIGHT LINE SHEARING

This is a division, of application Ser. No. 876,086, filed Feb. 8, 1978, now U.S. Pat. No. 4,174,647.

BACKGROUND OF THE INVENTION

The present invention relates generally to an apparatus for cutting successive portions from a column of plastic material such as viscous glass.

In the glass forming process, glass is fed from an outlet spout of a feeder bowl to a glass forming machine. A shear mechanism is mounted underneath the feeder bowl to successively cut gobs from the column of glass from the feeder bowl. One type of shear mechanism utilizes a pivoted shear structure wherein shear blades are mounted on swinging arms. In high speed applications, especially, there is a tendency for excessive wear in mechanisms of that type. Further, in double or triple gob applications, the gobs are not cut at exactly the same time. Thus, the gobs will not be delivered to the molds of a given machine section at exactly the same time thereby affecting the forming times.

To overcome the above problems, straight line shearing has been proposed. In straight line shearing, the shear blades advance in a straight line toward the issuing gobs from opposite directions. U.S. Pat. Nos. 1,642,966 issued to W. J. Miller on Sept. 20, 1927; 3,435,719 issued to F. J. Wythe on Apr. 1, 1969; and 3,996,037 issued to F. J. Wythe on Dec. 7, 1976 show examples of straight line shearing. Straight line shearing mechanisms may also be provided with means to adjust the vertical height of either the upper or lower shear blades to adjust the "tension" between opposite blades when they overlap during the cutting stroke. Such an arrangement is shown in U.S. Pat. No. 3,579,319 issued to F. J. Wythe and H. Hoette on May 18, 1971. Additionally, the drop guides for guiding the severed gob during its initial downward movement as it is being separated from the suspended molten glass column may be adjustable toward and away from the suspended column of molten glass as also shown in U.S. Pat. No. 3,579,319.

SUMMARY OF THE INVENTION

The present invention has for its object an improved mechanism for straight line shearing. One feature of the present invention resides in the provision of mounting means for at least one blade of a set of oppositely disposed shear blades having relative vertical movement with respect to the other blade, means for moving said mounting means vertically with respect to the other blade, and means permitting the one blade to tilt in the event of excess tension between the two blades.

Another feature of the present invention includes means mounting a drop guide for movement with an upper shear blade, means for moving said drop guide in the direction of travel of said shear blade relative to said shear blade, and means for pivoting said drop guide about a vertical axis.

Yet another feature of the invention is the provision of mounting means for mounting at least one shear blade of a set of oppositely disposed shear blades, said mounting means including a blade holder to which said one blade is attached and having a lower surface, a support member having an upper surface disposed under said lower surface, pin means positioned between said upper and lower surfaces and having an axis extending in the direction of movement of said blade to permit said blade holder to pivot about said axis relative to said support member, and means for securing said blade holder to said support member after said blade holder has been pivoted to the desired position.

Still another feature is the provision of an apparatus for use with a feeder for shearing gobs from a column of plastic material comprising:

(a) at least one set of oppositely disposed shear blades movable in a straight line toward and away from each other between open and shearing positions; and (b) a pneumatic control system for operating said shear blades, said control system including:
  (i) a source of fluid pressure;
  (ii) pneumatic cylinder assembly means including a piston member and operating rod for driving said shear blades between said open and shearing positions;
  (iii) means connecting said pneumatic cylinder assembly means to said source of fluid pressure including a first valve having first and second positions, said first position permitting fluid pressure to flow to one side of said piston to move said piston into the shearing position, said second position permitting fluid pressure flow to the other side of said piston member to move said piston member into the open position;
  (iv) means connecting said source of fluid pressure to said first valve to cause the actuation thereof including a second valve having first and second positions, said first position permitting fluid pressure to flow to said first valve to actuate said first valve into its first position, said second position permitting fluid pressure flow to said first valve to actuate said first valve into its second position;
  (v) means connecting said source of fluid pressure to said second valve to cause the actuation thereof into its first position and including a third valve having a normal position blocking fluid pressure flow and an actuated position permitting fluid pressure flow; and
  (vi) means driven by said operating rod to actuate said second valve into its second position after said shear blades have moved to their shearing position.

A further feature of the invention is the position of an apparatus for use with a feeder for shearing gobs from a column of plastic material comprising:

(a) at least one set of oppositely disposed shear blades movable in a straight line toward and away from each other between open and shearing positions;

(b) pneumatic cylinder assembly means including a piston member and an operating rod movable by fluid pressure between open and shearing positions for driving said shear blades between their open and shearing positions;

(c) means connecting said pneumatic cylinder to a source of fluid pressure to move said piston member between said open and shearing positions; and (d) means providing a cushion of fluid pressure for said piston member at the end of movement of said piston member from its shearing position to its open position.

A still further feature is the provision of an apparatus for use with a feeder for shearing gobs from a column of plastic material comprising:

(a) at least one set of oppositely disposed shear blades movable in a straight line toward and away from each other between open and shearing positions;

(b) pneumatic cylinder assembly means including a piston member and an operating rod movable by fluid pressure between open and shearing positions for driving said shear blades between their open and shearing positions;

(c) means connecting said pneumatic fluid to a source of fluid pressure to move said piston member between its open and shearing positions;

(d) means for controlling the flow of fluid to said piston including normal return actuating means driven by said operating rod to initiate the return of said piston member from its shearing position to its open position after said shear blades have moved to their shearing position; and (e) automatic return means for effecting return of said piston member to said open position in the event said shear blades do not travel completely to the shearing position to enable the normal return actuating means to initiate the return.

DESCRIPTION OF THE DRAWINGS

FIG. 2 is a sectional view taken along the lines 2—2 of FIG. 1;

FIG. 3 is a sectional view taken along the lines 3—3 of FIG. 1;

FIG. 4 is a sectional view taken along the lines 4—4 of FIG. 1;

FIG. 5 is a sectional view taken along the lines 5—5 of FIG. 1;

FIG. 6 is a sectional view taken along the lines 6—6 of FIG. 1;

FIG. 7 is a sectional view taken along the lines 7—7 of FIG. 1;

FIG. 8 is a sectional view taken along the lines 8—8 of FIG. 4;

FIG. 9 is a sectional view taken along the lines 9—9 of FIG. 3;

DESCRIPTION OF PREFERRED EMBODIMENT

Figure 1:
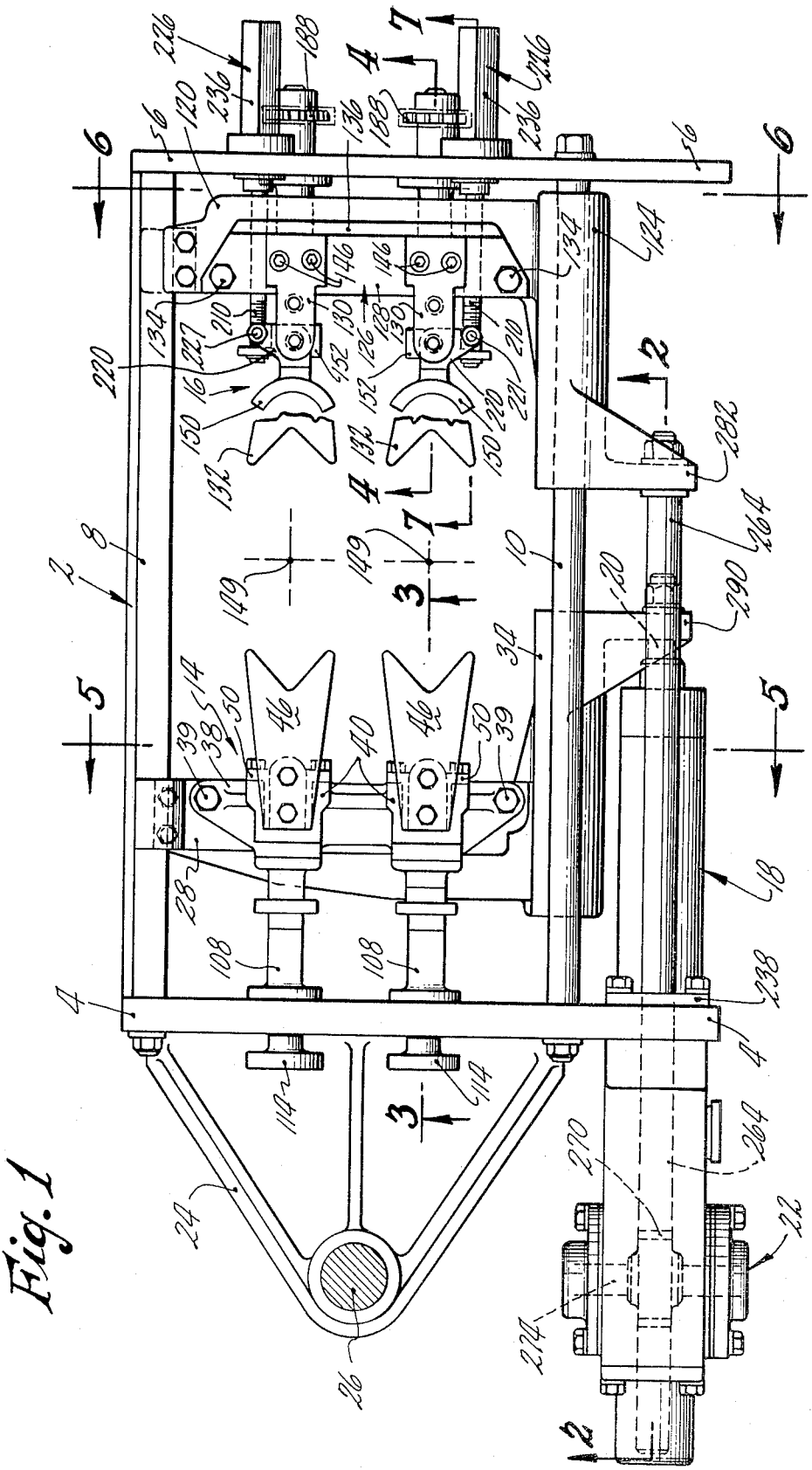
FIG. 1 is a plan view of a shear mechanism incorporating the present invention.

Referring to the drawings, and in particular, FIG. 1, the shear mechanism of the present invention includes a frame 2 including spaced end plates 4 and 6 interconnected by a first side rail 8 and upper and lower side rails 10 and 12. The side rails 10 and 12 are parallel to and spaced apart vertically from each other, and are spaced horizontally from the side rail 8 as shown in FIGS. 5 and 6.

A left-hand or lower shear head 14 is mounted on side rails 8 and 12 of the frame 2 for horizontal movement relative thereto as shown in FIGS. 1 and 5. A right-hand or upper shear blade 16 is mounted on side rails 8 and 10 of the frame 2 for horizontal movement relative thereto as shown in FIGS. 1 and 6. An air-cylinder assembly 18 is also mounted on the frame 2 and has its operating rod 20 directly connected to the left-hand shear head 14. The operating rod 20 is connected to the right-hand shear blade head 16 through a rack and pinion mechanism 22.

The shear mechanism may be attached to a feeder bowl of a feeder by means of a mechanism such as shown in U.S. Pat. No. 3,567,418 issued Mar. 2, 1971 to H. Hoette and incorporated herein by reference in its entirety. For this purpose, a bracket 24 may be attached to the frame 2 for mounting on the post 26 of the mounting mechanism shown in U.S. Pat. No. 3,567,418. It is to be understood that the shear mechanism may be attached to the feeder bowl by other means if desired. As the mounting means and feeder bowl are not directly involved with the present invention, they have not been shown in the drawings and will not be described further for the sake of clarity and simplicity.

With reference to FIGS. 1, 3 and 5, the left-hand or lower shear head 14 includes a carriage member 28 extending between rails 8 and 12. One end of the carriage member 28 has a C-shaped member 30 attached thereto, with the member 30 so positioned that the rail 8 is located within the opening 32. The other end of the carriage member 28 includes an elongated tubular portion 34 with a circular aperture 36 therethrough. The tubular portion is mounted on the lower rail 12 with the rail 12, which is circular, extending through the aperture 36.

A shear blade bracket 38 is attached to the top side of the carriage member 28 by mean of bolts 39 and is provided with two upstanding bosses 40, each having a square aperture 42 vertically therethrough and its front side, which faces the right-hand or upper shear head 16, open to form a square C-shaped configuration. A shear blade holder 44 is mounted within each of the bosses 40 for sliding movement in a vertical direction with respect to the shear blade bracket 38. A lower shear blade 46 is attached to the top horizontal surface 48 of each of the holders 44 by screws 49 or the like. The forward face of each boss 40 is closed by a spring plate 50 secured to the bracket 38 by suitable means such as hex screws 52. Positioned within each boss is a pressure plate 54 which is spaced from the spring plate 50 and is urged against the forward face 56 of the shear blade holder 44 by means of coil springs 58. A dowel pin 60 extends into openings in the spring plate 50 and pressure plate 54 to maintain the pressure plate 54 in proper position. A wear plate 62 is suitably attached to the rear surface of the shear blade holder 44.

The forward face 56 of each shear blade holder 44 is provided with a slot 64 in which a link member 66 is mounted and pivotally attached to the holder 44 by means of a pivot pin 68 as shown in FIG. 3. A yoke 70 is mounted within each boss 40 and has a forward rod portion 72 extending through an aperture 74 in the spring plate 50 and a rearward rod portion 76 extending through an aperture 78 in the shear blade bracket 38, whereby the yoke 70 has horizontal relative movement along its axis with respect to the bracket 38. The lower end of the link member 66 is pivotally attached to the body 80 of the yoke 70 by means of a pivot pin 82.

A spool member 84 is threadedly received on the rearward rod portion 76 of each of the yokes 70. Each spool member 84 has a flange 86 at its forward end which is received within a counterbore 88 in the shear blade bracket 38. A bracket member 90 surrounds each spool member 84 and each is attached to the shear blade bracket 38 in a suitable manner as by hex screws (not shown) to captivate the flange of the spool member 84 and prevent axial movement thereof relative to the bracket 38 in an axial direction. A bearing 92 is provided between the bracket member 90 and the spool member 84 to facilitate rotation of the spool member 84 about its axis within the bracket member 90.

An indexing head 94 is received on each spool member 84 and is suitably attached thereto by means such as a roll pin 96. The indexing head 94 is provided with a circular peripheral surface 98 in which a plurality of evenly spaced pin members 100 are mounted to extend radially outwardly from the indexing head 94 as shown in FIG. 9. A spring biased detent 102 is mounted in the bracket member 90 to releasably engage one of a plurality of slots 104 spaced about the inside face of the indexing head 94 to prevent accidental rotation of the indexing head 94 by vibration or other causes.

An indexing rod 106 is mounted in a bushing 108 which is attached to the end plate 4 of the frame 2. Bearings 110 are provided between the bushing and indexing rod 106 to facilitate rotation of the indexing rod 106. The indexing rod 106 includes an end portion 112 extending through the end plate 4 to which is attached a hand knob 114 by suitable means such as a roll pin 116. The indexing rod 106 extends under the indexing head 94 and includes an elongated fin 118 mounted in an elongated slot 119 and projected out of the periphery of the rod portion of the indexing rod 106 a distance sufficient to engage a pin member 100 when the indexing rod is rotated. The length of the indexing rod 106 and the fin 118 should be sufficient so that the fin is positioned under the indexing head 94 during the entire stroke of the shear head 14 so that each blade may be adjusted while the mechanism is running.

With the arrangement just described, the height of the lower shear blade 46 may be adjusted by turning the hand knob 114. Rotation of the hand knob 114 causes rotation of the indexing head 94 by means of the fin 118 engaging successive pins 100 on the indexing head upon each 360° rotation of the indexing rod 106. Rotation of the indexing head 94 causes rotation of the spool member 84 which, in turn, because of its threaded connection with the yoke 70, causes the yoke 70 to move horizontally along its axis. Because of the link member 66 provided between the yoke 70 and shear blade holder 44, horizontal movement of the yoke 70 causes the shear blade holder to move vertically within the shear blade bracket 38. The provision of the spring biased pressure plate 54 enables the outer end of the lower shear blade 46 along with its shear blade holder 44 to tilt for a purpose to be more fully discussed below.

With reference to FIGS. 1, 4, 6 and 7, the right-hand or upper shear head 16 includes a carriage member 120 mounted on and extending between the rails 8 and 10 of the frame 2. The carriage member 120 includes at one end a C-shaped member 122 which rides on the rail 8. The other end of the carriage member 120 includes an elongated tubular portion 124 surrounding and riding on the circular rail 12. A shear blade assembly 126 is mounted on the carriage member 120 and includes an elongated shear blade support 128, two spaced shear blade holders 130 and two upper shear blades 132. The shear blade support 128 is attached to the carriage member 120 by suitable screws 134 and includes an upstanding flange 136 running its entire length at the rearward side. The upper planar surface 138 of the shear blade support 128 is provided with two spaced semi-circular grooves 140, each being co-axial with one of two circular holes 142 through the flange 136. A pin member 144 is mounted in each of the grooves 140 and extends into the associated hole 142 as shown in FIG. 4.

The bottom surface of each shear blade holder 130 is provided with a semi-circular groove 145 mating with one of the grooves 140 in the shear blade support 128. The shear blade holder 130 is attached to the shear blade support 128 by means of two screws 146 positioned on either side of the axis of the pin member 144. An upper shear blade 132 is attached to each of the shear blade holders 130 by means of screws 148. When the plane of the bottom surface of the shear blade holder 130 is parallel to the plane of the planar upper surface 138 of the shear blade support 128, some clearance should exist between these faces. With this arrangement, when screws 146 are loosened, the generally horizontal surface of the shear blade 132 may be pivoted about the axis of the pin member 144 to adjust the inclination of the under surface of the upper shear blade 132 so that it mates correctly with the upper surface of its associated lower shear blade 46 while shearing.

It will be observed from FIG. 1 that the facing edges of the shear blades 46 and 132 are notched and that they constitute the cutting or shearing edges of the blade. When the blades are in the cut or shearing position, the cutting edge of each of the upper blades 132 passes over the cutting edge of its associated lower blade 46. The gobs having issued from a feeder (not shown) on the vertical centerline 149 of the orifices, which centerlines extend through the shear blades 46 and 132 when the blades are in the cut or shearing position.

As the lower shear blades 46 are each independently adjustable in a vertical direction, the tension between each set of associated upper and lower blades may be adjusted. With the arrangement described above, this adjustment may be made while the blades are moving. Additionally, since the lower shear blade 46 of each set of blades can tilt in the event of excess tension, the possibility of damage to the blades and possible injury due to breakage of the blades is reduced.

A drop guide 150 is mounted for movement with the carriage member 120 under each of the upper shear blades 132 as shown in FIGS. 1 and 4. Each drop guide 150 is attached to a drop guide holder 152 by means of a cap screw 154 extending through an aperture 156 in the drop guide 150 which is provided with a bushing 158 to facilitate pivotal movement of the drop guide 150 about the axis of cap screw 154 for a purpose to be described below. The drop guide holder 152 is attached to the carriage member 120 by virtue of two guide pins 160, attached to the drop guide holder 152 and sliding received in bushing lined apertures 162 in the carriage member 120. Thus, each drop guide 150 can move in a horizontal direction relative to the shear blades 132.

An adjusting screw 164 having a head portion 166 at one end received in a counterbore 168 in the drop guide holder 152 includes a threaded portion 170 received in a threaded bore 172 through the carriage member 120. The other end of the adjusting screw 164 has an indexing head 174 mounted thereon and secured against relative movement therewith by a roll pin 176. As shown in FIGS. 4 and 8, the indexing head 174 is provided with a circular peripheral surface 178 in which a plurality of evenly spaced pin members 180 are mounted to extend radially outwardly from the surface 178.

An indexing rod 182 is mounted in a bushing 184 which extends through the end plate 6 of the frame 2. The indexing rod 182 includes an end portion 186 extending through the outer end of the bushing 184 to which is attached a sprocket member 188 by suitable means such as a roll pin 190. The indexing rod 182 extends under the indexing head 174 and includes two diametrically opposed fins 192 and 194 mounted in elongated slots 196 and 198 respectively and projecting out of the periphery of the rod portion of the indexing rod 182 a distance sufficient to engage a pin member 180 when the indexing rod 182 is rotated. The length of the finned portion of the indexing rod 182 should be sufficient so that the fins 192 and 194 are positioned under the indexing head 174 during the entire stroke of the shear blade head so that each drop guide 150 may be adjusted during the time the mechanism is running. A spring biased detent member 200 (shown dotted in FIG. 4) is mounted in each drop guide holder 152 to engage one of a plurality of slots 202 in the forward face of an index wheel 204 which is attached to the adjusting screw 164 by means of a roll pin 206 or other suitable connection to prevent relative rotation therebetween. The cooperation between the detent member 200 and a given slot 202 will prevent accidental rotation of the indexing rod 182 due to vibration or the like. A chain 208 (shown dotted in FIG. 4) may be connected to the sprocket member 188 and be of suitable length so that the sprocket member 198 can be turned by an operator standing on the main floor.

With the arrangement just described, each drop guide 150 can be independently adjusted in a horizontal direction toward and away from the centerline 149 of an orifice. Rotation of the sprocket member 188 causes rotation of the indexing head 174 by means of one or the other of the fins 192 or 194 engaging successive pin members 180 upon each 180° rotation of the indexing rod 182. Rotation of the indexing head 174 causes the adjusting screw 164 and, thus the drop guide 150, to move horizontally in a direction along the axis of the adjusting screw 164 relative to the carriage member 120.

Referring now to FIGS. 1 and 7 in particular, an adjusting shaft 210 may be provided in connection with each drop guide 150 to pivot the drop guide 150 about the vertical axis of its cap screw 154. The adjusting shaft 210 has a reduced forward end portion 212 received in an aperture 214 in the drop guide holder 152 and restrained therein in an axial direction by a retaining ring 216. A nut member 218 is received on a threaded portion 219 of the adjusting shaft 210 and is pivotally attached to lever arm portion 220 of the drop guide 150 by a pivot pin arrangement 221. The adjusting shaft 210 extends through the carriage member 120 and through an enlarged opening 222 in the end plate 6. Mounted in the enlarged opening 222 is a bushing 224 which is attached to the end plate 6 by a screw member 225. A knob assembly 226 is mounted in the bushing and is retained therein for relative rotation therewith by means of a shoulder 228 thereon and a retaining ring 230 as shown in FIG. 7. If desired, a bearing washer 232 may be provided between the retaining ring 230 and the end plate 6 and also between the shoulder 228 and end plate 6. The outer end portion of the adjusting shaft 210 may be provided with a keyway 233 to which the knob assembly 226 may be keyed by a key member 234. The outer surface 236 of the knob assembly 226 which extends out from the frame 2 may be hexagonal in cross-section so that it may be rotated about its axis by a hex wrench or other suitable implement.

By virtue of the construction just described, each drop guide 150 may be adjusted about a vertical axis running through the cap screw 154. When the knob assembly 226 is rotated, the adjusting shaft 210 is also rotated because of the keyed connection. Since the adjusting shaft 210 cannot move axially due to its connection to the drop guide holder 152, rotation of the adjusting shaft causes the nut member 218 to move to the right or left (as viewed in FIG. 7) causing the drop guide to pivot about the axis of the cap screw 154.

The length of the outer end portion of the adjusting shaft 210 which is provided with the keyway 233 should be sufficiently long so that the shaft 210 remains keyed to the knob assembly 226 during the entire stroke of the shear head 16. This enables the drop guide 150 to be adjusted toward and away from a suspended column of molten glass while the mechanism is in operation. The drop guide serves to guide the severed knob during its initial downward movement as it is being separated from the suspended molten glass column. As the lower shear blade 46 passes under the upper shear blade 132, there is a tendency for the gob, as it is cut or sheared, to have its upper end moved toward the upper shear head 16 by the lower blade 46. As the horizontal position of each drop guide 150 is adjustable, each drop guide 150 can be independently moved to the best guiding position. Further, if there is a tendency for the gob to be moved by the lower shear blade 46 in a direction transverse to the direction of movement of the shear heads 14 and 16, the fact that each drop guide 150 can be independently adjusted about a vertical axis, provides a side adjustment for the drop guide to control the fall of the gob.

It should be mentioned at this time that the preceding description of the present invention was made in connection with a mechanism for use with a double gob feeder. That is, a mechanism for use in connection with a feeder that feeds two columns of glass and thus, is provided with two sets of shear blades, both sets acting simultaneously. However, the present invention, both as previously described, and as described below is applicable to a single gob apparatus where only one set of blades is provided, or to one in which more than two are provided, such as a triple gob apparatus wherein three sets of blades act simultaneously.

In fact, the mechanism as described is easily changed from two sets of blades as shown to one using either a single set or more than two sets. To change to a different number of lower shear blades 46, the shear blade bracket 38 may be removed from the carriage member 28 by removing the bolts 39. A new bracket previously equipped with the desired number of shear blades and each blade provided with its adjustment mechanism as described above can then be attached to the carriage member 28. Indexing rods 106 will have to be removed or added and spaced as necessary. Similarly, in the case of the upper shear blades 132, the shear blade holder 128 may be removed from the carriage member 120 by removing bolts 134. A new holder 128, previously outfitted with the required number of blades may then be attached. Drop guides 150 will have to be added or removed as required and their spacing changed as necessary. The carriage member 120 may have pre-drilled apertures to permit mounting of a drop guide in single gob and double gob configurations.

The left and right-hand shear heads 14 and 16 are moved toward each other, through the cutting stroke, and returned to their dwell or retract position by means of the pneumatic cylinder assembly 18. Referring to FIGS. 1 and 2, the pneumatic cylinder assembly 18 is mounted on the end plate 4 by means of a retainer plate 238 which is attached to the cylinder assembly 18 by means of a nut member 240 threaded onto a threaded boss 241 which extends through an aperture 242 in the retainer plate 238. The retainer plate 238 is attached to the end plate 4 by suitable screws or bolts 243 as shown in FIG. 5. The air cylinder assembly 18 includes a cylinder member 244 in which is mounted a piston member 246 (shown in dotted lines in FIG. 2). The operating rod 20 is attached to the piston member 246 and has a forward portion 248 extending out of the cylinder member 244 toward end plate 6 and a rearward portion 250 extending in an opposite direction out of the cylinder member 244. Suitable ports 252 and 254 are provided in the cylinder to admit pneumatic fluid such as air to the rearward and forward sides respectively of the piston as will be described in more detail below.

The rearward portion 250 of the operating rod 20 extends into a housing 256 attached to the outside of the end plate 4. The housing 256 includes upper and lower rack guiding sleeves 258 and 260. The rearward portion 250 of the operating rod 20 extends into the lower rack guiding sleeve 260 and is attached to a short rack member 262. If desired, the short rack member 262 may be formed directly on the operating rod 20. A rack rod 264 is mounted in the upper rack guiding sleeve 258 and extends forwardly toward the right-hand shear blade head 16. The rearward end of the rack rod 264 has suitable teeth 266 for engaging the teeth 268 of a pinion 270 mounted in the housing 256 and positioned between the rack rod 264 and short rack member 262. The short rack member 262 includes suitable teeth 272 for engaging the teeth 268 of the pinion 270. The pinion 270 is keyed to a shaft 274 mounted for rotation in the housing 256 along an axis perpendicular to the axis of the rack rod 264 and rack member 262. The rearward end of the housing 256 is closed by a rack cover 276 suitably attached to the cover by bolts 280 or the like.

The rack rod 264 has its forward end reduced, threaded and attached to a flange portion 282 extending from the tubular portion 124 of the carriage member 120 of the right-hand, or upper, shear head 16. Washer members 284 are disposed on either side of a flange portion 282 and a lock washer 286 and a nut member 288 are provided to secure the connection. The forward portion 248 of the operating rod 20 is directly connected to a flange portion 290 extending from the tubular portion 34 of the carriage member 28 of the left-hand, or lower, shear head 14. The forward end of the forward portion 248 of the operating rod 20 is reduced, threaded, and attached to the flange portion 290 by means of washer members 292 disposed on either side of the flange portion 290, a lock washer 294 and a nut member 296.

With the above described construction, when pneumatic fluid enters the cylinder 244 through port 252, the piston member 246 will move to the right as viewed in FIG. 2, and port 254 will serve as an exhaust port. Movement of the piston member 246 in this direction causes the left-hand, or lower, shear head 14 also to move the right. At the same time, the short rack member 262 will cause the pinion 270 to rotate counter-clockwise, driving the rack rod to the left. This in turn drives the right-hand, or upper, shear head 16 to the left on the frame 2 toward the moving left-hand, or upper, shear head 14. This movement of the shear heads 14 and 16 toward each other continues until the upper shear blades 132 pass over the top of lower shear blades 46 and the cutting stroke is completed. Pneumatic fluid may then be admitted to the other side of the piston member 246 through port 254, cause the piston member to return to its position as shown in FIG. 2 and moving the shear blade heads 14 and 16 away from each other to their retracted or dwell position shown in FIG. 1.

FIGS. 10–14 illustrate the pneumatic control system used to actuate and control the movement of the shear blade heads 14 and 16. The air cylinder assembly 18 is represented schematically in FIGS. 10–14 and movement of the piston member 246 to the right as viewed in these FIGURES represents the cutting stroke and movement of the piston member to the left represents the return or retracting stroke.

In general, the pneumatic control system includes a fluid pressure supply line 300 connected to a tank or receiver 302 through a check valve 304. The outlet from the tank 302 passes through a lubricator 306 and splits into three supply lines 308, 310, 312. Line 308 is connected to a first port 314 of a cushion operator valve 316, which is a three way valve having a mechanical operator and automatic retract. Port 318 of valve 316 is connected to an exhaust line 320 and port 322 is connected to a cushion control valve pilot line 324. Valve 316 is of the type that when the valve is actuated, ports 314 and 322 are interconnected and when the valve is automatically retracted or unactuated, ports 318 and 322 are interconnected.

Figure 10:
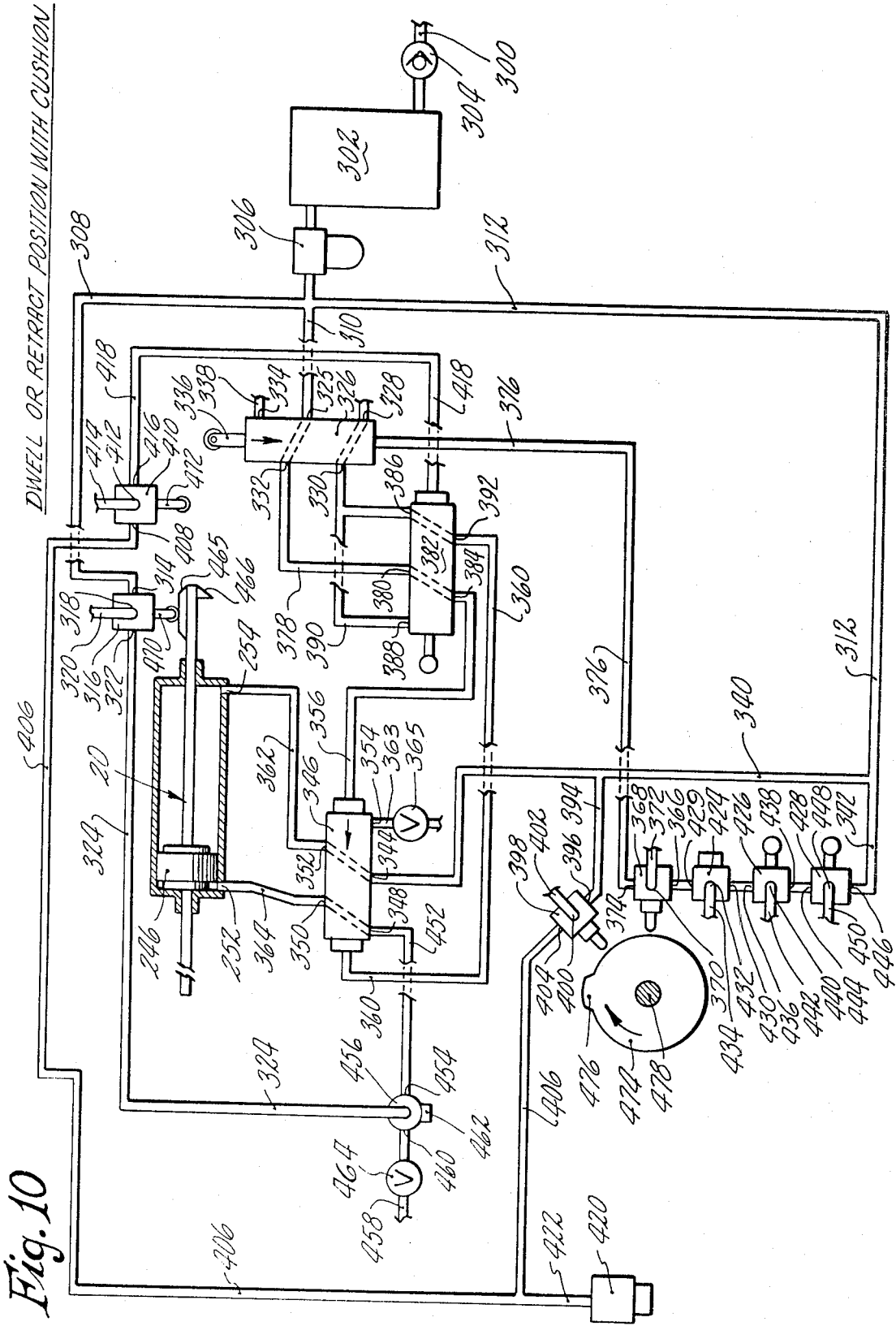
FIG. 10 is a schematic diagram of a pneumatic control system used to operate the air cylinder assembly which drives the shear heads of the mechanism of FIG. 1, the system being shown with the piston of the air cylinder assembly in the retracted position.
Figure 11:
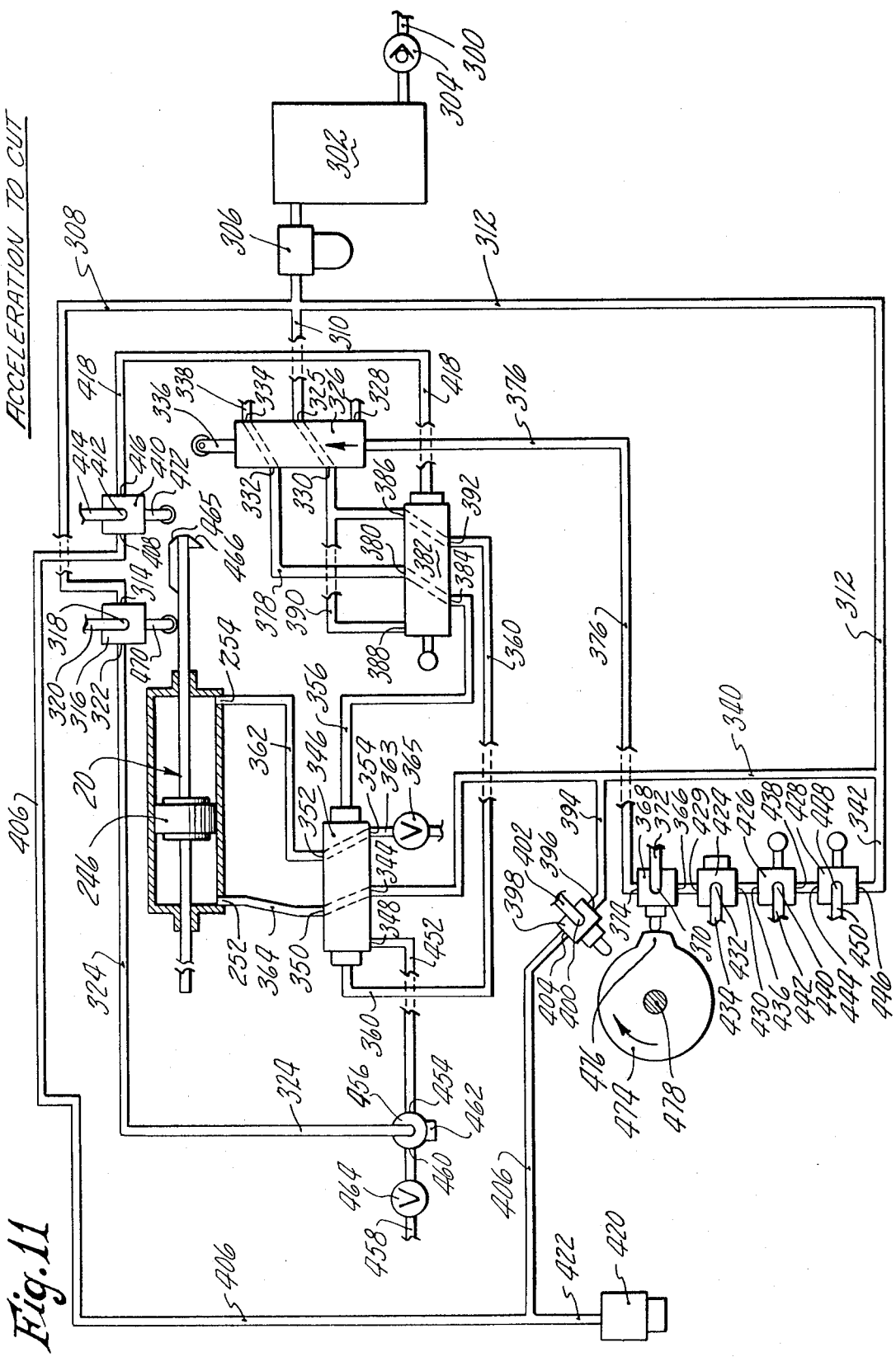
FIG. 11 is a schematic diagram of the pneumatic control system shown as the piston member of the air cylinder assembly is moving outwardly to drive the shear heads to their cutting position.

Supply line 310 is connected to a port 325 of a cut-retract operator valve 326. Valve 326 is a spool valve which is pilot operated in one direction and mechanically operated in the other direction. Valve 326 is provided with four other ports 328, 330, 332 and 334 arranged to be interconnected as follows: when the valve 326 has been mechanically actuated (with its mechanical actuator 336 in the down position as shown in FIG. 10) ports 325 and 332 are interconnected and ports 328 and 330 are interconnected; and when the valve 326 is pilot operated (which raises the mechanical actuator as shown in FIG. 11) port 334 is connected to port 332 and port 325 is connected to port 330. An exhaust line 338 is connected to the port 334. Valve 326 may be adjustably mounted to adjust the amount of shear blade overlap during the cutting stroke as explained more fully below.

The supply line 312 splits into two lines, a cylinder actuating line 340 and a cycle start line 342. The cylinder actuating line 346 is connected to port 344 in a cut-retract control valve 346. The cut-retract control valve 346 is a spool valve, pilot operated in both directions. The valve 346 is provided with four additional ports 348, 350, 352 and 354 adapted to be placed in communication by actuation of the valve 346 as follows: when pilot line 356 is pressurized as shown in FIG. 10, ports 344 and 352 are interconnected and ports 348 and 350 are interconnected, and when pilot line 360 is pressurized as shown in FIG. 11, ports 344 and 350 are interconnected and ports 352 and 354 are interconnected. A piston retract line 362 connects the port 352 of the valve 346 to the port 254 of the cylinder assembly to admit pressure to the right side of the piston member 246 and drive it to the left. A piston advance or cut line 364 connects port 350 of the valve 346 to the port 252 of the cylinder assembly to communicate to admit pressure to the left side of the piston member 246 and drive it to the right. An exhaust line 363, having a cutting stroke speed control needle valve 365 therein, is connected to port 354.

The cycle start line 342 is attached to one port 366 of a cycle start valve 368. The cycle start valve 368 is a three way valve having a mechanical operator and automatic retract. Port 370 of valve 368 is connected to an exhaust line 372 and port 374 thereof is connected to a cut-retract operator valve pilot line 376. Valve 368 is arranged such that when it is unactuated as shown in FIG. 10 and in its retracted position, port 374 is interconnected with port 370. When the valve 368 is actuated as shown in FIG. 11, port 374 is interconnected with port 366. The cut-retract operator valve pilot line 376 is connected to the pilot actuator of the cut-retract operator valve 326.

Figure 14:
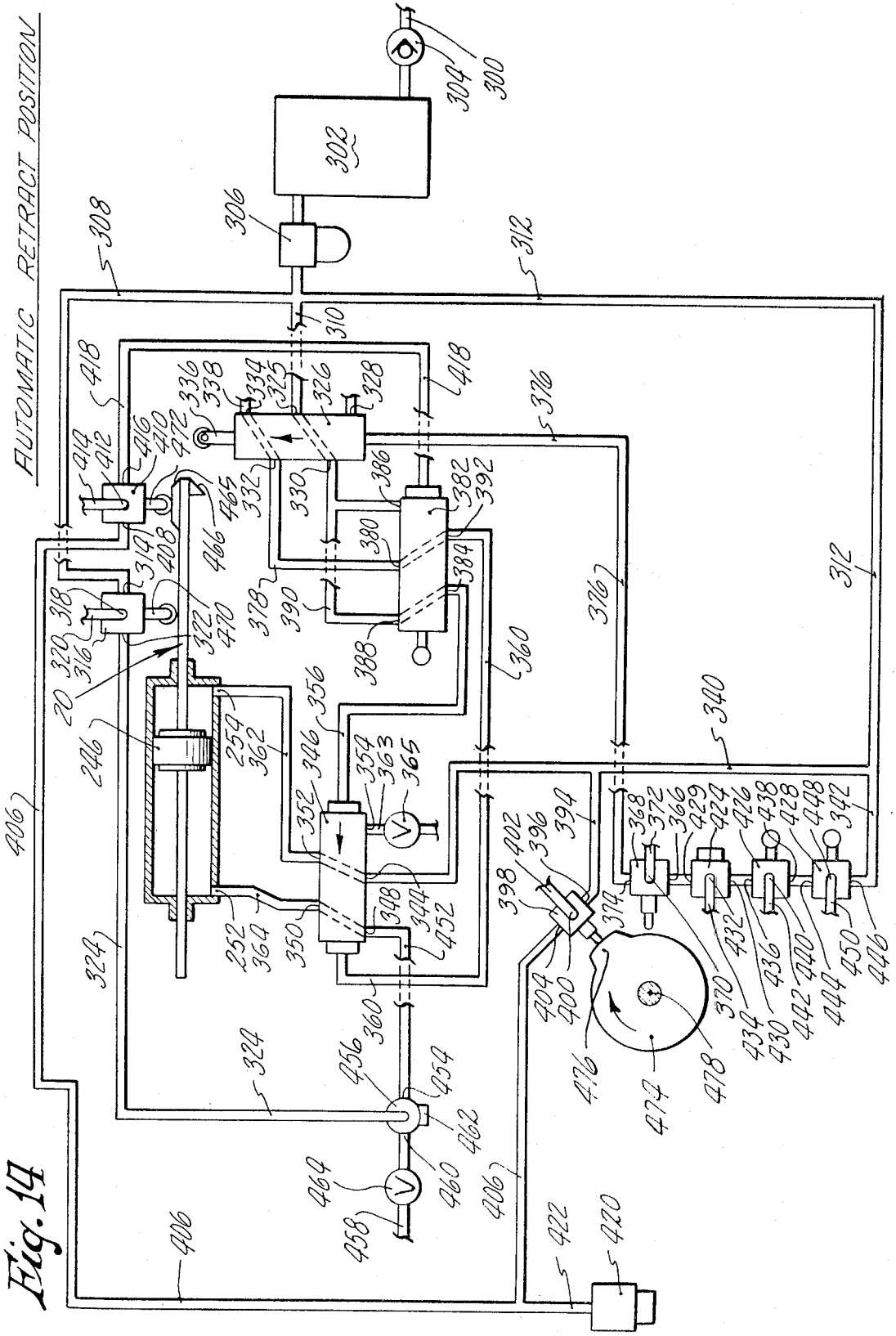
FIG. 14 is a schematic diagram of the pneumatic control system showing the operation of the automatic retract feature in the event that the shear heads are prevented from completing their cutting stroke.

Port 332 of the cut-retract operator valve 326 is connected by a line 378 to a port 380 of an automatic retract-reset valve 382 which is a spool valve, pilot operated in one direction, manual reset in the other direction. When the valve 326 is in its reset or normal operating position as shown in FIG. 10, port 380 is interconnected with a port 384 to which the pilot line 356 of valve 346 is connected. Valve 382 also includes two other ports 386 and 388, both of which are connected by branched line 390 to port 330 of the cut-retract operator valve 326. With valve 382 in the reset position as shown in FIG. 10, port 386 is interconnected with a port 392 to which pilot line 360 of valve 346 is connected. When valve 382 is pilot actuated as shown in FIG. 14, ports 384 and 388 are interconnected and ports 380 and 392 are interconnected.

A branch line 394 from the cylinder actuating line 340 is connected to a port 396 of an automatic retract signal valve 398. Another port 400 of the valve 398 is connected to an exhaust line 402 and a third port 404 is connected by a line 406 to a port 408 of an automatic retract operator valve 410. The automatic retract signal valve 398 is three-way valve, mechanically operated and automatically reset. The valve 398 is arranged so that when the valve is in its normal, reset position as shown in FIG. 10, ports 400 and 404 are interconnected and when it is mechanically actuated, ports 396 and 404 are interconnected.

The automatic retract operator valve 410 includes a second port 412 which is connected to an exhaust line 414 and a third port 416 connected to an automatic retract-reset valve pilot line 418 which in turn is connected to the pilot actuator side of the automatic retract-reset valve 382. Valve 410 is of the mechanically operated, automatic retract type and is arranged such that when it is in the normal retract position, port 412 is interconnected with port 416 and when it is actuated, port 408 is interconnected with port 416.

The port 404 of the automatic retract signal valve 398 also may be connected to a pressure switch 420 by means of a branch line 422 coming from line 406. The pressure switch 420 may be used to supply a signal to a computer or other device for the purpose of counting the number of cutting strokes of the shear blade heads 14 and 16 as explained below.

In the cycle start line 342 upstream of the cycle start valve 368 and downstream of line 340, a series of safety valves 424, 426, 428 may be provided. Each of these valves 424, 426, and 428 serve to retract the shear blade heads 14 and 16 when actuated and prevent further operation thereof in a manner to be described in detail below. The safety valve 424, which is the power loss retract valve, is a three way solenoid actuated valve. The valve 424 is arranged so that when the presence of electricity actuates the solenoid, ports 429 and 430, which connects line 342, are interconnected and, when the electricity fails, port 429 is interconnected with a port 432 to which is attached an exhaust line 434.

Valves 426 and 428 are three way manually actuated valves, one of which may be positioned at the feeder level and the other of which may be positioned at the floor level, so that one can be actuated by an operator at either level. The valves 426 and 428 when actuated from their normal position shown in FIG. 10, cause the shear blade head 14 and 16 to retract and the cycle to stop in a manner to be described below. Valve 426 is provided with ports 436 and 438 which normally are interconnected and are connected to line 342. However, when the valve 426 is actuated from the normal position, downstream port 436 is interconnected with a port 440 to which is attached an exhaust line 422. Valve 428 is similarly arranged in that ports 444 and 446 are normally interconnected and connected to line 342, and upon activation, downstream port 444 is interconnected with a port 448 to which an exhaust line 450 is connected. Thus, the normal arrangement is that line 342 enters port 446 of valve 428, exits valve 428 through port 444, enters valve 426 by port 438, exits valve 426 by port 436, enters valve 424 through port 430 and exits from port 429 and is then connected to port 366 of valve 368. In normal operation, there is no interruption in the flow of pneumatic fluid through line 342 to the valve 368. When any of the valves 424, 426, or 428 are actuated, flow of pneumatic fluid from the tank to the valve 368 is cut off, and the downstream side of line 342 is connected to an exhaust line.

Port 348 of the cut-retract control valve 346 may be connected by a cushion control line 452 to a port 454 of a three-way pilot operated automatic reset cushion control valve 456. The cushion control valve pilot line 324, which is connected at one end to valve 316, has its other end connected to the actuator side of valve 456. An exhaust line 458 is connected to another port 460 of valve 456 and a third port 462 thereof is plugged. A return stroke speed control needle valve 464 may be positioned in the exhaust line 458 adjacent the valve 456. Valve 456 is so arranged that when the pilot line 324 is pressurized, port 454 is interconnected with plugged port 462 and flow from line 452 is blocked. When the pilot line 324 is not pressurized, valve 456 is reset and port 454 is interconnected with port 460.

The cushion operator valve 316, the automatic retract operator valve 410 and the cut-retract operator valve 326 are all adapted to be actuated by cam member moving in synchronization with the operating rod 20 of the cylinder assembly 18. In FIGS. 10-14, the cam member is shown attached directly to the operating rod 20 and includes cam surfaces 465 and 466. In actuality, the necessary cam surfaces may be provided on the operating rod, the rack rod 264 or either the right-hand or left-hand shear blade heads 14 or 16. According to the preferred embodiment of the invention the cam surfaces are provided by a cam block 468 attached to the carriage member 120 of the upper shear blade head 16 as shown in FIG. 6.

As shown in FIG. 10, when the shear blade heads 14 and 16 are in their dwell or retract position cam surface 465 engages the actuator 470 of valve 316. As the shear blade heads 14 and 16 move through their cutting stroke, and the operating rod 20 moves to the right as viewed in FIG. 10, cam surface 465 will engage the actuator 472 of valve 410. At the end of the desired stroke the actuator 336 of valve 326 will be engaged. As this valve initiates the return stroke, valve 326 may be adjustably mounted so that the distance the operating rod 20 must travel before the valve 326 is actuated may be varied, thereby providing means for varying the amount of overlap of the shear blades 46 and 132. Alternatively, the location of cam surface 466 may be made adjustable for the same purpose.

The cycle start valve 368 and the automatic retract signal valve 398 are actuated by a cam wheel 471 having a cam portion 476 thereon and which is driven in synchronization with the feeder to enable the cutting stroke to be timed with relationship to the operation of the feeder. For this purpose, the cam wheel 474 may be mounted on the feeder cam shaft 478. Other methods of timing the operation of valves 398 and 368 may be utilized such as utilizing a computer to send a signal at the desired time to cause the actuation of those valves.

Referring specifically to FIG. 10, the pneumatic control system is shown in the dwell or retract position of the shear blade heads 14 and 16 with a pneumatic cushion provided for the return stroke of the piston member 246. According to the arrangement shown in FIG. 10, lines 308, 310 and 312 are normally pressurized by the source of pressurized fluid. The actuator of cut-retract operator valve 326 has been actuated so that pneumatic fluid flows from line 310 through line 336 into line 378. The automatic retract-reset valve 382 is in its manually reset position so that fluid flows through valve 382 from line 378 into line 356 to the pilot actuator of the cut-retract control valve 346 to move the valve 346 to its left-hand position. Line 340 is also normally pressurized so, with the cut-retract control valve 346 actuated as described above fluid will flow through the valve 346, through line 362 and through the cylinder port 254 and pressurizes the right-hand side of the cylinder assembly 18 forcing the piston member 246 to the rear or left-hand side of the cylinder assembly 18. With the piston member 246 in its retracted position, cam surface 465 engages the actuator 470 of valve 316 whereby fluid pressure in line 308 flows through the valve 316 into line 324 to the pilot actuator of the cushion control valve 456 causing the actuation thereof. With the valve 456 being pilot actuated, flow of fluid in the line 452 through the valve 456 is blocked. As line 452 is connected through valve 346 to line 364 which is connected to port 252 on the rearward or left-hand side of the cylinder assembly, the fluid remaining in the left-hand chamber of the cylinder assembly 18 is not exhausted, and thus forms a cushion for the piston member 246. As the cam portion 476 of cam wheel 474 has not engaged the actuator of the cycle start valve 368, fluid pressure in line 342 is cut off from line 376 and the fluid pressure in line 376 is exhausted through valve 368 to the exhaust line 372. Fluid in line 406 may exhaust through valve 398 to exhaust line 402 and fluid in line 360 may exhaust through valve 382 to line 390 and through valve 326 to exhaust line 328.

Referring now to FIG. 11 which shows the control system during the cutting stroke, it will be seen that the cutting stroke is initiated by the cam portion 476 of cam wheel 474 actuating cycle start valve 368. When valve 368 is actuated, fluid from line 342 passes through valve 368 into pilot line 376 causing the actuation or upward movement of the actuator of cut-retract operator valve 326. With valve 326 pilot actuated, fluid pressure from line 310 will pass through valve 326 into line 390 through valve 382 into pilot line 360 to the pilot actuator of cut-retract control valve 346 causing valve 346 to be actuated into its right-hand position. With valve 346 so actuated, fluid will flow from line 340 through valve 346 into port 252 at the left-hand side of the cylinder assembly 18 and cause the piston member 246 along with the operating rod 20 to move to the right. Pressure or fluid in front of the piston 246 will exit through port 254 and through line 362 and valve 346 into exhaust line 363 and through the needle valve 365. As the needle valve can be adjusted to provide varying rates of flow through it, the rate of exhaust of the fluid in the forward or right-hand chamber of the cylinder assembly 18 can be varied, thereby varying the speed of movement of the piston member 246 during the cutting stroke. Pilot line 356 is exhausted through valve 382, line 378 and valve 326 to exhaust line 338. As the cam member 465 is out of engagement with the actuator of the cushion operator valve 316, pressure in line 324 can exhaust through valve 316 into exhaust line 320 thereby permitting valve 456 to reset. Fluid pressure in line 308 is blocked by valve 316 from flowing through valve 316 into line 324.

Figure 12:
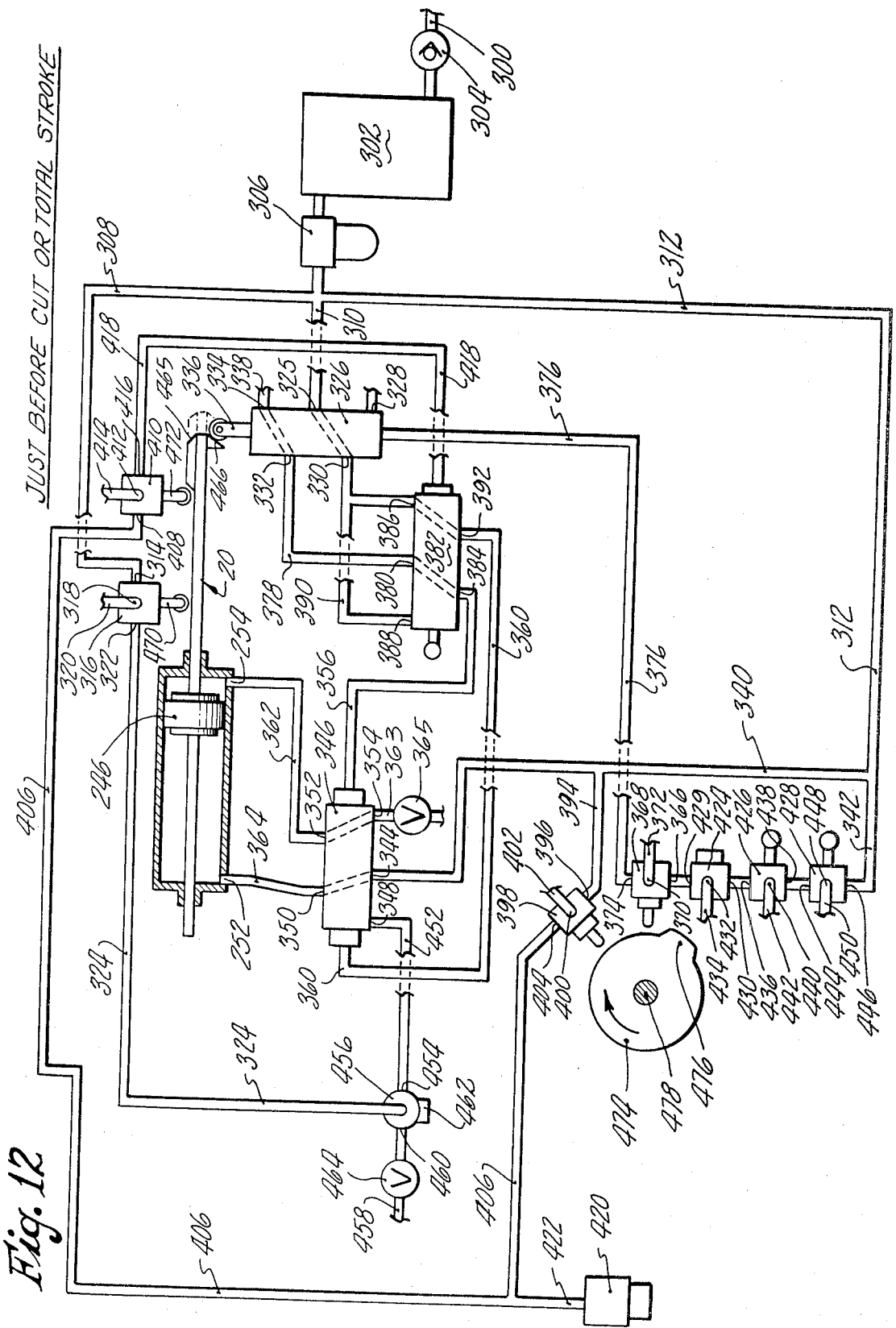
FIG. 12 is a schematic diagram of the pneumatic control system shown just before the piston member of the air cylinder assembly has reached the end of its cutting stroke.

FIG. 12 shows the control system just before the cut or total stroke of the operating rod 20. At this point, the cam surface 466 has not engaged actuator 336 of cut-retract operator valve 326. However, the cam portion 476 of cam wheel 474 has rotated out of engagement with the actuator of valve 368 whereby valve 368 automatically resets itself so that flow through line 342 to line 376 is blocked and the fluid in line 376 can exhaust through valve 368 to exhaust line 372.

Figure 13:
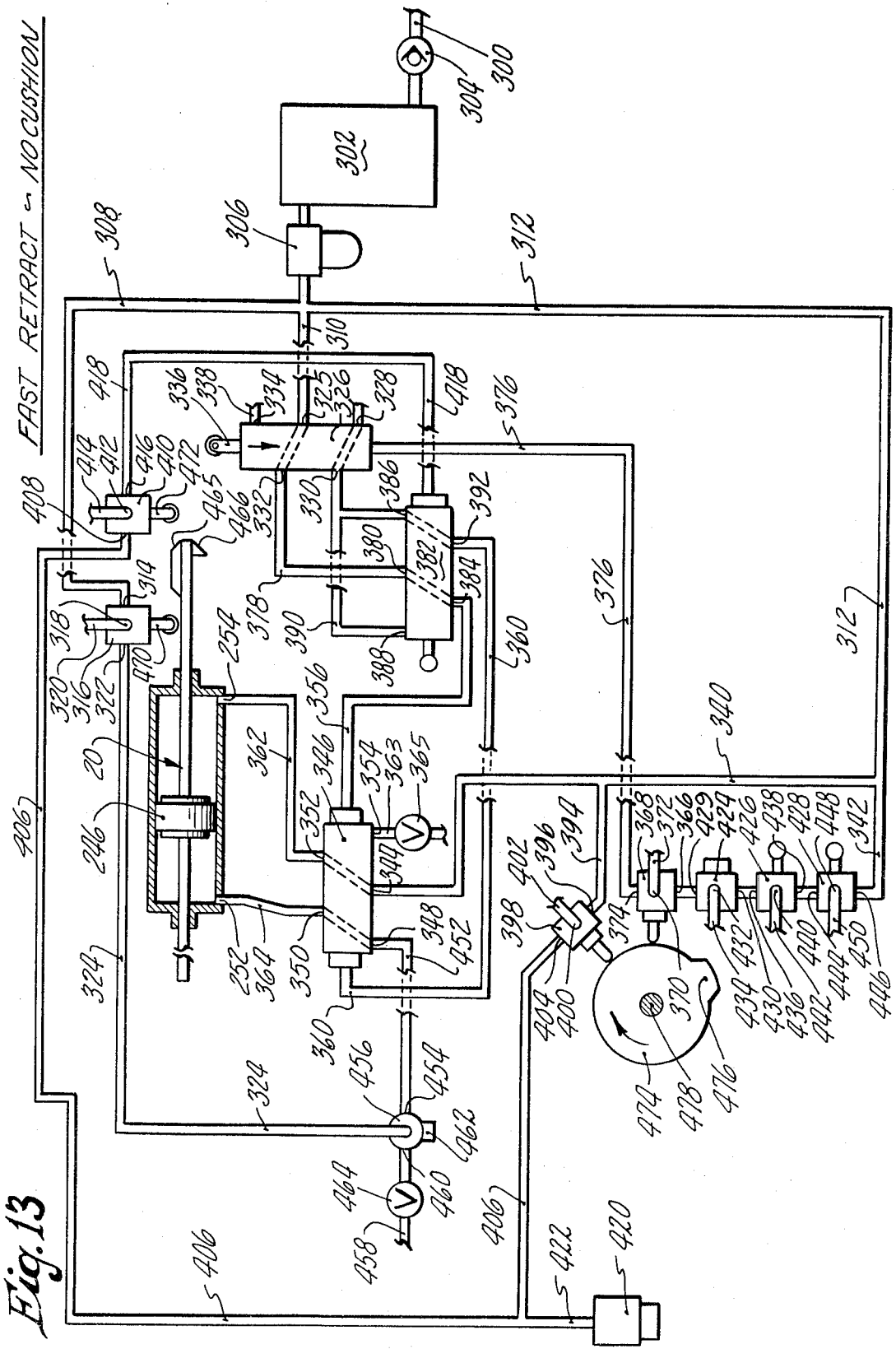
FIG. 13 is a schematic diagram of the pneumatic control system shown as the piston member of the air cylinder assembly is being retracted.

When the cam portion 466 of the operating rod 20 engages the actuator 336 of the cut-retract operator valve 326, the fast return stroke of the operating rod 20 is started as shown in FIG. 13. When the valve 326 is actuated by the cam surface 466, the valve 326 is moved into its downward position with the fluid in pilot line 376 exhausting through valve 368 into exhaust line 372. With valve 326 so positioned, fluid flows from line 310 through valve 326 through line 378 through valve 382 to pilot line 356 causing cut-retract control valve 346 to move to its left-hand position. With valve 346 so actuated, fluid can flow from line 340 through valve 346 into line 362 to port 254 of the cylinder assembly 18 and into the right-hand or forward side of the piston 246 driving the piston 246 to the rear or left as viewed in FIG. 14. The fluid in the left-hand side of the cylinder assembly 18 (to the rear of the piston 246) exists through port 252, line 364, valve 346, line 452 and valve 456 through the needle valve 464 to exhaust line 458. As the needle valve 464 is adjustable to vary the rate of flow therethrough, it will be seen that by so adjusting valve 464, the rate of exhaust of fluid from the left-hand side of cylinder assembly 18 may be varied thereby varying the speed of return of the operating rod 20. The operating rod continues to move rearwardly as viewed in FIG. 13 until the cam surface 465 actuates cushion operator valve 316 causing fluid to flow through valve 316 from line 308 into pilot line 324 and actuate cushion control valve 456 so that exhaust from line 452 through valve 456 is blocked thereby providing a cushion for the return of the piston member 246 as described above.

FIG. 14 shows the automatic retract operation of the fluid control system. In the event that the shear blade heads 14 and 16 do not complete their cutting stroke for some reason, such as engaging a stone or other debris in the glass, and thus, the stroke of the operating rod 20 is not sufficient to have cam 466 engage the actuator 366 of the cut-retract operator valve 326, the shear blade heads 14 and 16 will still be retracted. If operating rod 20 does not complete its stroke, cam surface 465 will actuate the actuator 472 of automatic retract operator valve 410. Note that actuator 472 should be so positioned that it is engaged by the cam surface 465 during the cutting stroke of the operating rod prior to cam surface 466 engaging the cut-retract operator valve 326. With valve 410 so actuated, fluid can flow through valve 410 from line 406 to line 418. However, line 406 is not pressurized until the cam portion 476 of cam wheel 474 actuates the automatic retract signal valve 398. This occurs toward the end of the cycle of cam wheel 474 before the cam portion 476 actuates valve 368 to start a new cycle. When valve 398 is so actuated, fluid will flow from line 340 through line 394 through valve 398 through line 406 through valve 410 through pilot line 418 to the pilot actuator of the automatic retract reset valve 382. This causes the valve 382 to move to its left-hand position. With this arrangement, fluid pressure flows from line 310 through valve 326 through line 390 through valve 382 to pilot line 356 to the pilot actuator of cut-retract control valve 346 causing valve 346 to move to its left-hand position. Fluid pressure can then flow through line 340 through valve 346 to line 362 into the forward or right-hand side of the cylinder assembly 18 driving the piston member 246 to the rear or to its retract position. It will be noted that until valve 382 is manually reset, there will be no operation of the shear blade heads 14 and 16 as fluid pressure cannot flow through valve 382 to pilot line 360 to valve 346. Actuation of valve 368 by the cam portion 476 of cam wheel 474 will simply pressurize line 376 with no resulting piston movement.

In the normal course of operation when automatic retract signal valve 398 is actuated by cam 476 without the simultaneous actuation of the automatic retract operator valve 410 by the same surface 465, the only result will be line 406 being pressurized for a brief interval of time each cycle. However, when line 406 is pressurized fluid pressure will also be transmitted through line 422 to the pressure switch 420. Thus the pressure switch 420 will be actuated once each cycle to provide a count of the cutting strokes as explained above.

If any one of the valves 424, 426 or 428 are actuated, the shear heads 14 and 16 will be retracted and the cyclic operation thereof will be halted. Assuming for example the valve 426 is actuated by an operator from its normal position. Then, flow through line 342 to valve 368 will be blocked. Thus, once the cut-retract operator valve 326 is in its downward position, fluid will flow from line 310 through valve 326, line 378, valve 382, pilot line 356 to the pilot actuator of valve 346 to actuate and maintain valve 346 in a position so that fluid can flow from line 340 through valve 346 through line 362 to port 254 of the cylinder assembly 18 and the forward or right-hand side of the piston member 246 to maintain the piston member 246 in its left-hand or retracted position. Even if cam 476 should actuate valve 368, no fluid will flow to valve 326 to cause the operation of the shear heads 14 and 16 since the fluid in line 342 is blocked by the valve 426 upstream of valve 368.

Thus, by virtue of the above described system, a novel and unique power control system is provided to operate the cut and retract strokes of the shear heads 14 and 16. Means are incorporated into the system to vary the amount of shear overlap at the end of the cutting stroke. Additionally, the system provides a cushion for the piston member of the cylinder assembly at the end of the retract stroke. Also, an automatic retract feature is provided to ensure retraction of the shear heads 14 and 16 in the event the full cutting stroke is not obtained.

What is claimed is:

1. An apparatus for use with a feeder for shearing gobs from a column of plastic material comprising:
   (a) at least one set of shear blades movable toward and away from each other between shearing and open positions;
   (b) pneumatic cylinder assembly means including a piston and an operating rod movable by fluid pressure between open and shearing positions for driving said shear blades between their open and shearing positions;
   (c) first valve means having first and second positions, said first position connecting a source of fluid pressure to one side of said piston and connecting the other side to an exhaust line to move said piston into the open position, said second position connecting a source of fluid pressure to the other side of said piston to move said piston into the shearing position;
   (d) cushion valve means having a first position permitting exhaust fluid to flow through said first valve means to the exhaust line and a second position blocking flow to said exhaust line; and
   (e) cushion actuating means actuatable in response to the movement of the piston from its shearing to its open position to move said cushion valve means from the first position to its second position to block the flow to the exhaust from said other side.

2. The apparatus of claim 1 wherein said cushion valve means is a fluid actuated valve, and said cushion actuating means includes a valve which when actuated connects a source of fluid pressure to the fluid actuated valve to cause the actuation thereof.

* * * * *